US011920521B2

United States Patent
Thorup et al.

(10) Patent No.: US 11,920,521 B2
(45) Date of Patent: Mar. 5, 2024

(54) TURBOSHAFT LOAD CONTROL USING FEEDFORWARD AND FEEDBACK CONTROL

(71) Applicant: General Electric Company, Schenectady, NY (US)

(72) Inventors: Jessie Thorup, Malden, MA (US); Christopher David King, Salem, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/665,800

(22) Filed: Feb. 7, 2022

(65) Prior Publication Data

US 2023/0287836 A1  Sep. 14, 2023

(51) Int. Cl.
*F02C 9/26* (2006.01)
*B64C 27/12* (2006.01)

(52) U.S. Cl.
CPC ........... *F02C 9/26* (2013.01); *B64C 27/12* (2013.01)

(58) Field of Classification Search
CPC ........ B64D 31/00; B64D 31/06; B64C 27/12; F02C 7/26; F02C 3/10; F02C 9/28; F02D 2041/141; G05D 7/00
See application file for complete search history.

(56) References Cited

U.S. PATENT DOCUMENTS

| 3,630,023 A | * | 12/1971 | Lazar | F15C 1/002 |
| | | | | 73/112.06 |
| 3,729,929 A | * | 5/1973 | Kiscaden | F02C 7/26 |
| | | | | 60/39.281 |
| 4,010,605 A | * | 3/1977 | Uram | F02C 7/26 |
| | | | | 700/290 |

(Continued)

FOREIGN PATENT DOCUMENTS

| CN | 102506860 A | 6/2012 |
| CN | 105464814 A | 4/2016 |
| EP | 2441938 A1 | 4/2012 |

OTHER PUBLICATIONS

Andoga et al., Digital Electronic Control of a Small Turbojet Engine MPM 20, Acta Polytechnica Hungarica, Department of Cybernetics and Artificial Intelligence, Faculty of Informatics and Electrical Engineering, vol. 4, Issue 4, Slovakia, 2007, 13 Pages.

(Continued)

*Primary Examiner* — Alain Chau
(74) *Attorney, Agent, or Firm* — Dority & Manning, P.A.

(57) ABSTRACT

Control schemes for controlling a gas turbine engine in response to disturbances associated with a load mechanically coupled with the gas turbine engine are provided. In one aspect, a gas turbine engine mechanically coupled with a load has a controller that includes executable control logic. The control logic includes a feedforward module, an aggressive control module, and a power turbine governor module. By executing the modules, the controller seeks to maintain a constant power turbine speed stably and subtly in response (Continued)

to small disturbances associated with the load and aggressively in response to large disturbances associated with the load, as well as smooth transitions between the responses.

20 Claims, 8 Drawing Sheets

(56) References Cited

U.S. PATENT DOCUMENTS

| | | | | |
|---|---|---|---|---|
| 4,016,717 | A | * | 4/1977 | Smith ................ F02C 9/32 60/39.182 |
| 4,038,526 | A | | 7/1977 | Eccles et al. |
| 4,147,035 | A | | 4/1979 | Moore et al. |
| 4,411,595 | A | | 10/1983 | Pisano |
| 4,470,118 | A | * | 9/1984 | Morrison ............. F02C 9/28 701/100 |
| 4,478,038 | A | * | 10/1984 | Cropper .............. F02C 9/28 60/773 |
| 4,537,025 | A | * | 8/1985 | Cropper .............. F02C 9/28 434/54 |
| 4,993,221 | A | | 2/1991 | Idelchik |
| 5,083,277 | A | * | 1/1992 | Shutler .............. F02C 9/28 701/100 |
| 5,231,823 | A | | 8/1993 | Curran et al. |
| 5,265,826 | A | | 11/1993 | Ebert et al. |
| 5,687,082 | A | | 11/1997 | Rizzoni |
| 5,771,482 | A | | 6/1998 | Rizzoni |
| 6,195,247 | B1 | | 2/2001 | Cote et al. |
| 6,302,356 | B1 | | 10/2001 | Hawkins |
| 6,408,834 | B1 | | 6/2002 | Brackney et al. |
| 6,476,510 | B2 | * | 11/2002 | Soucy .............. H02P 9/04 290/40 C |
| 6,557,530 | B1 | | 5/2003 | Benson et al. |
| 6,602,057 | B2 | | 8/2003 | Saxena et al. |
| 6,823,834 | B2 | | 11/2004 | Benson et al. |
| 6,990,855 | B2 | | 1/2006 | Tuken et al. |
| 7,136,738 | B2 | * | 11/2006 | Zagranski ........... F02C 9/28 701/100 |
| 7,206,688 | B2 | | 4/2007 | Wang et al. |
| 7,275,514 | B2 | | 10/2007 | Kuo et al. |
| 7,540,270 | B2 | | 6/2009 | Kang et al. |
| 7,721,686 | B2 | | 5/2010 | Lindgarde |
| 7,784,451 | B2 | | 8/2010 | Chi |
| 7,931,231 | B2 | | 4/2011 | Cherepinsky et al. |
| 8,105,018 | B2 | | 1/2012 | Gockel et al. |
| 8,302,397 | B2 | | 11/2012 | Liu et al. |
| 8,311,579 | B2 | | 11/2012 | Rofougaran et al. |
| 8,321,104 | B2 | * | 11/2012 | Mahmood ........... G05B 5/01 701/100 |
| 8,327,117 | B2 | | 12/2012 | Smilg et al. |
| 8,428,849 | B2 | | 4/2013 | Maruyama et al. |
| 8,437,946 | B2 | | 5/2013 | Sasaki et al. |
| 8,468,821 | B2 | | 6/2013 | Liu et al. |
| 8,504,175 | B2 | | 8/2013 | Pekar et al. |
| 8,640,679 | B2 | | 2/2014 | Wang et al. |
| 8,965,288 | B2 | | 2/2015 | Barnes et al. |
| 8,989,921 | B2 | | 3/2015 | Nannoni et al. |
| 9,181,835 | B2 | | 11/2015 | Aliyev |
| 9,206,756 | B2 | | 12/2015 | Zhu et al. |
| 9,217,362 | B2 | | 12/2015 | Wang et al. |
| 9,228,511 | B2 | | 1/2016 | Zhu et al. |
| 9,291,093 | B2 | | 3/2016 | Wang et al. |
| 9,297,319 | B2 | | 3/2016 | Wang et al. |
| 9,342,060 | B2 | | 5/2016 | Fuller et al. |
| 9,347,401 | B2 | | 5/2016 | Zhu et al. |
| 9,394,838 | B2 | | 7/2016 | Guralp et al. |
| 9,494,085 | B2 | | 11/2016 | Cai |
| 9,500,138 | B1 | | 11/2016 | Cai et al. |
| 9,677,493 | B2 | | 6/2017 | Stewart et al. |
| 9,683,503 | B2 | | 6/2017 | Zhang et al. |
| 9,689,335 | B2 | | 6/2017 | Ge |
| 9,732,625 | B2 | | 8/2017 | Cai |
| 9,777,657 | B2 | | 10/2017 | Wang et al. |
| 9,821,916 | B2 | | 11/2017 | Massot |
| 9,835,099 | B2 | | 12/2017 | Zhu et al. |
| 9,874,160 | B2 | | 1/2018 | D'Amato et al. |
| 9,885,297 | B2 | | 2/2018 | Wang et al. |
| 9,932,918 | B2 | | 4/2018 | Haskara et al. |
| 10,006,375 | B1 | | 6/2018 | Wagner et al. |
| 10,036,331 | B2 | | 7/2018 | Cai et al. |
| 10,240,544 | B2 | | 3/2019 | Zeller et al. |
| 10,252,812 | B2 | | 4/2019 | Gutz |
| 10,302,020 | B2 | | 5/2019 | Gutz et al. |
| 10,759,528 | B2 | * | 9/2020 | Wulff ................ B64C 27/06 |
| 10,961,922 | B2 | | 3/2021 | Meisner et al. |
| 11,015,480 | B2 | | 5/2021 | Waun |
| 2002/0093201 | A1 | * | 7/2002 | Soucy .............. B60L 50/13 290/40 B |
| 2004/0093151 | A1 | | 5/2004 | Zagranski et al. |
| 2004/0200207 | A1 | * | 10/2004 | McKelvey .......... F02C 7/26 60/39.281 |
| 2010/0017093 | A1 | * | 1/2010 | Mahmood ........... F01D 11/24 701/100 |
| 2011/0184623 | A1 | | 7/2011 | De Boer |
| 2013/0008171 | A1 | | 1/2013 | Djelassi |
| 2015/0292967 | A1 | | 10/2015 | McArthur |
| 2016/0009377 | A1 | | 1/2016 | Khalid |
| 2017/0152856 | A1 | | 6/2017 | Grassens et al. |
| 2017/0218815 | A1 | | 8/2017 | Stewart et al. |
| 2017/0334569 | A1 | * | 11/2017 | Marin ................ F02C 3/10 |
| 2018/0072430 | A1 | | 3/2018 | Misfeldt |
| 2018/0134380 | A1 | * | 5/2018 | Wulff ................ B64C 27/04 |
| 2018/0163638 | A1 | * | 6/2018 | Gutz ................ F02C 9/28 |
| 2020/0217253 | A1 | | 7/2020 | King |
| 2022/0195947 | A1 | * | 6/2022 | Giunta ................ F02C 9/22 |

OTHER PUBLICATIONS

Wikipedia, Accelerometer, The Free Encyclopedia, Jul. 18, 2016, 9 Pages. https://en.wikipedia.org/wiki/Accelerometer.

* cited by examiner

TURBOSHAFT LOAD CONTROL USING FEEDFORWARD AND FEEDBACK CONTROL

FEDERALLY SPONSORED RESEARCH

This invention was made with Government support under W58RGZ-16-C-0047 awarded by the U.S. Army. The Government has certain rights in this invention.

FIELD

The present subject matter relates generally to controlling a fuel flow demand of a gas turbine engine.

BACKGROUND

Some gas turbine engines include, in serial flow communication, a gas generator compressor, a combustor, a gas generator turbine, and a power turbine. The combustor generates combustion gases that are channeled to the gas generator turbine where they are expanded to drive the gas generator turbine. Then, the combustion gases are channeled to the power turbine where they further expand to drive the power turbine. The gas generator turbine is coupled to the gas generator compressor via a gas generator shaft, and the power turbine is coupled to an output shaft via a power turbine shaft. The output shaft may be coupled to a load, such as a main rotor of a helicopter.

Gas turbine engines typically include an engine controller to determine an amount of fuel (e.g., fuel flow demand) the gas turbine engine requires in order to produce a desired power. In operation, the engine controller can execute control logic in order to output a fuel flow demand that can be used to control fuel flow to the engine. The desired output of the load can be achieved by controlling the fuel flow to the engine. It would be welcomed in the art to provide improved control of an engine in response to disturbances or changes in desired power from a load coupled with the engine.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
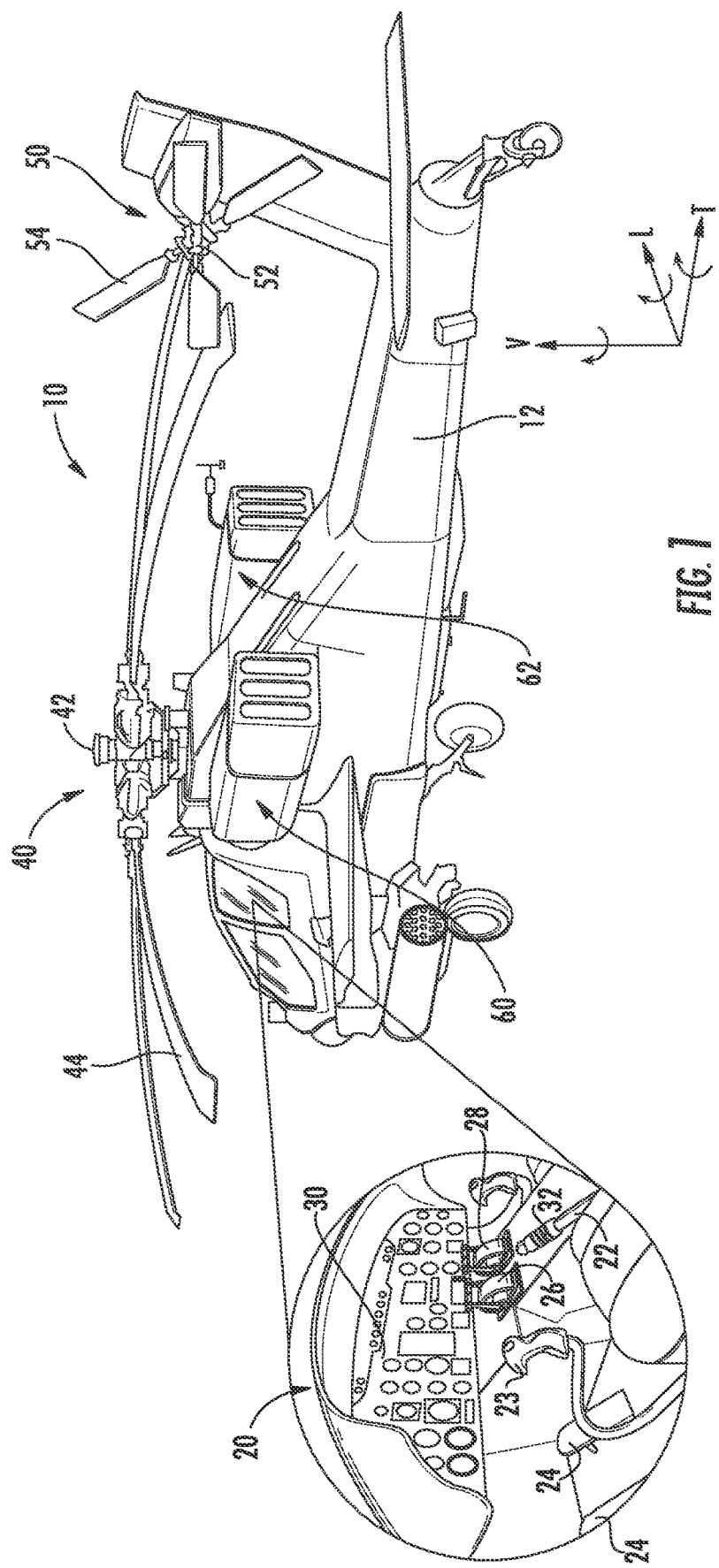
FIG. 1 is a perspective view of an aircraft in accordance with one embodiment of the present disclosure.

Reference will now be made in detail to present embodiments of the subject matter, one or more examples of which are illustrated in the accompanying drawings. Each example is provided by way of explanation of the subject matter, not limitation of the subject matter. In fact, it will be apparent to those skilled in the art that modifications and variations can be made in the present subject matter without departing from the scope thereof. For instance, features illustrated or described as part of one embodiment may be used on another embodiment to yield a still further embodiment. Thus, it is intended that the present subject matter covers such modifications and variations as come within the scope of any claims and their equivalents.

The detailed description uses numerical and letter designations to refer to features in the drawings. Like or similar designations in the drawings and description have been used to refer to like or similar parts of the subject matter, and identical numerals indicate the same elements throughout the drawings. As used herein, the terms "first", "second", and "third" may be used interchangeably to distinguish one component from another and are not intended to signify location or relative importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 2, 5, 10, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally directed to controlling fuel flow to a gas turbine engine using both feedforward and feedback control in response to disturbances associated with a load mechanically coupled with the gas turbine engine. Particularly, control logic is provided that seeks to maintain a constant power turbine speed stably and subtly in response to relatively small disturbances associated with the load and aggressively in response to relatively large disturbances associated with the load, as well as smooth transitions between the responses.

In one example aspect, a gas turbine engine mechanically coupled with a load of an aircraft is provided. For instance, the gas turbine engine can be a turboshaft engine and the load can be a main rotor of a helicopter. The gas turbine engine can include a controller having one or more processors configured to execute various operations, including turboshaft speed control logic to maintain a constant speed of the power turbine of the gas turbine engine despite disturbances associated with the rotor. The turboshaft speed control logic includes a feedforward governing module and a feedback governing module.

The feedforward governing module includes a feedforward module that translates an aircraft input rate into a first fuel flow demand. For instance, the aircraft input rate can correspond to a rate of change of the pitch angle of the main rotor of a helicopter in response to manipulation of a collective control device. The feedforward module may not be rate limited, which may allow for quick initial acceleration. The feedback governing module includes an aggressive control module and a power turbine governor module. The power turbine governor module translates a power turbine speed error into a third fuel flow demand while the aggressive control module calculates a system error based on the power turbine speed error, a power turbine speed error rate derived from the power turbine speed error, and a bandwidth of the one or more processors executing the feedback governing module. The aggressive control module translates the system error into a second fuel flow demand. Generally, the aggressive control module is configured to apply a quick and forceful "kick" when there is a relatively large disturbance with the rotor load, e.g., a relatively large increase or decrease in demanded lift.

The first, second, and third fuel flow demands are summed, and a composite fuel flow demand is determined. The fuel flow to the gas turbine engine can be controlled based on the composite fuel flow demand. Ultimately, the feedforward and feedback governing modules collectively allow the power turbine to maintain constant speed stably in response to relatively small disturbances in rotor load and aggressively in response to relatively large disturbances in rotor load. The turboshaft control logic synthesizes these two objectives into one cohesive control scheme.

The turboshaft speed control logic disclosed herein may provide a number of technical effects, advantages, and benefits. For instance, as noted above, the feedforward module of the present disclosure may not need to be rate limited. Moreover, the feedforward module of the present disclosure utilizes the rate of change of aircraft inputs as opposed to direct inputs, which reduces the physical modeling of the rotor system to an estimation of the partial derivative, rather than an exact calculation. This may streamline processing times and may free up processing resources. Further, the feedback governing module of the present disclosure allows for stable governing in response to relatively small rotor load disturbances by way of the power turbine governor module and quickly and forcefully in response to relatively large rotor load disturbances by way of the aggressive control module. Transition to or from aggressive control can occur smoothly as the "kick" provided by the aggressive control module is not filtered through the power turbine governor module. It will be appreciated that the inventive aspects of the present disclosure may provide other benefits and advantages in addition to those expressly noted herein.

Turning now to the drawings, FIG. 1 provides a perspective view of an aircraft 10 in accordance with one example embodiment of the present disclosure. In FIG. 1, the aircraft 10 is a rotorcraft, and more specifically, a helicopter. The aircraft 10 defines an orthogonal coordinate system, including three orthogonal coordinate axes. More specifically, the three orthogonal coordinate axes include a lateral axis L, a longitudinal axis T, and a vertical axis V. In operation, the aircraft 10 may move along or around at least one of the lateral axis L, the longitudinal axis T, and the vertical axis V.

In the embodiment illustrated in FIG. 1, the aircraft 10 includes an airframe 12 defining a cockpit 20. The cockpit 20 includes, among other things, a collective pitch input device 22, a cyclic pitch input device 23, a tail rotor input device 24, a first throttle input device 26, a second throttle input device 28, and an instrument panel 30. The aircraft 10 further includes a main rotor assembly 40 and a tail rotor assembly 50. The main rotor assembly 40 includes a main rotor hub 42 and a plurality of main rotor blades 44. As shown, each main rotor blade 44 extends outwardly from the main rotor hub 42. The tail rotor section 50 includes a tail rotor hub 52 and a plurality of tail rotor blades 54. Each tail rotor blade 54 extends outwardly from the tail rotor hub 52.

In addition, the aircraft 10 includes a first gas turbine engine 60 and a second gas turbine engine 62. The first and second gas turbine engines 60, 62 generate and transmit power to drive rotation of the main rotor blades 44 and the tail rotor blades 54. Rotation of the main rotor blades 44 generates lift for the aircraft 10, while rotation of the tail rotor blades 54 generates sideward thrust at the tail rotor section 50 and counteracts torque exerted on the airframe 12 by the main rotor blades 44.

The collective pitch input device 22 adjusts the pitch angle of the main rotor blades 44 collectively (i.e., all at the same time) to increase or decrease the amount of lift the aircraft 10 derives from the main rotor blades 44 at a given rotor speed. More specifically, manipulating the collective pitch input device 22 causes the aircraft 10 to move in one of two opposing directions along the vertical direction V, or in other instances, to maintain a hover maneuver. Manipulating the collective pitch input device 22 can also be used to anticipate the amount of power the first and second gas turbine engines 60, 62 provide the main rotor assembly 40 to generate the desired lift of the aircraft 10. The collective pitch input device 22 may include an input device 32 configured to set a reference speed for the first and second gas turbine engines 60, 62. In one exemplary embodiment, the input device 32 may be a switch configured to set the reference speed for both the first and second gas turbine engines 60, 62.

The cyclic pitch input device 23 controls movement of the aircraft 10 around the longitudinal axis T and around the lateral axis L. In particular, the cyclic pitch input device 23 adjusts an angle of the aircraft 10 thereby allowing the aircraft 10 to move forward or backwards along the longitudinal direction T or sideways in the lateral direction L. Additionally, the tail rotor input device 24 controls a pitch angle of the tail rotor blades 54. In operation, manipulating the tail rotor input device 24 may cause the tail rotor section 50 to move along the lateral direction L, which changes the orientation of the aircraft 10.

The first and second throttle input devices 26, 28 may be moved to an on position at the start of a flight and kept in the on position for the duration of the flight. For example, the first and second throttle input devices 26, 28 may be moved to a FLY position at the start of a flight and may remain in this position through the duration of the flight. In some instances, the first and/or second throttle input devices 26, 28 may be moved to a different position.

Figure 8:
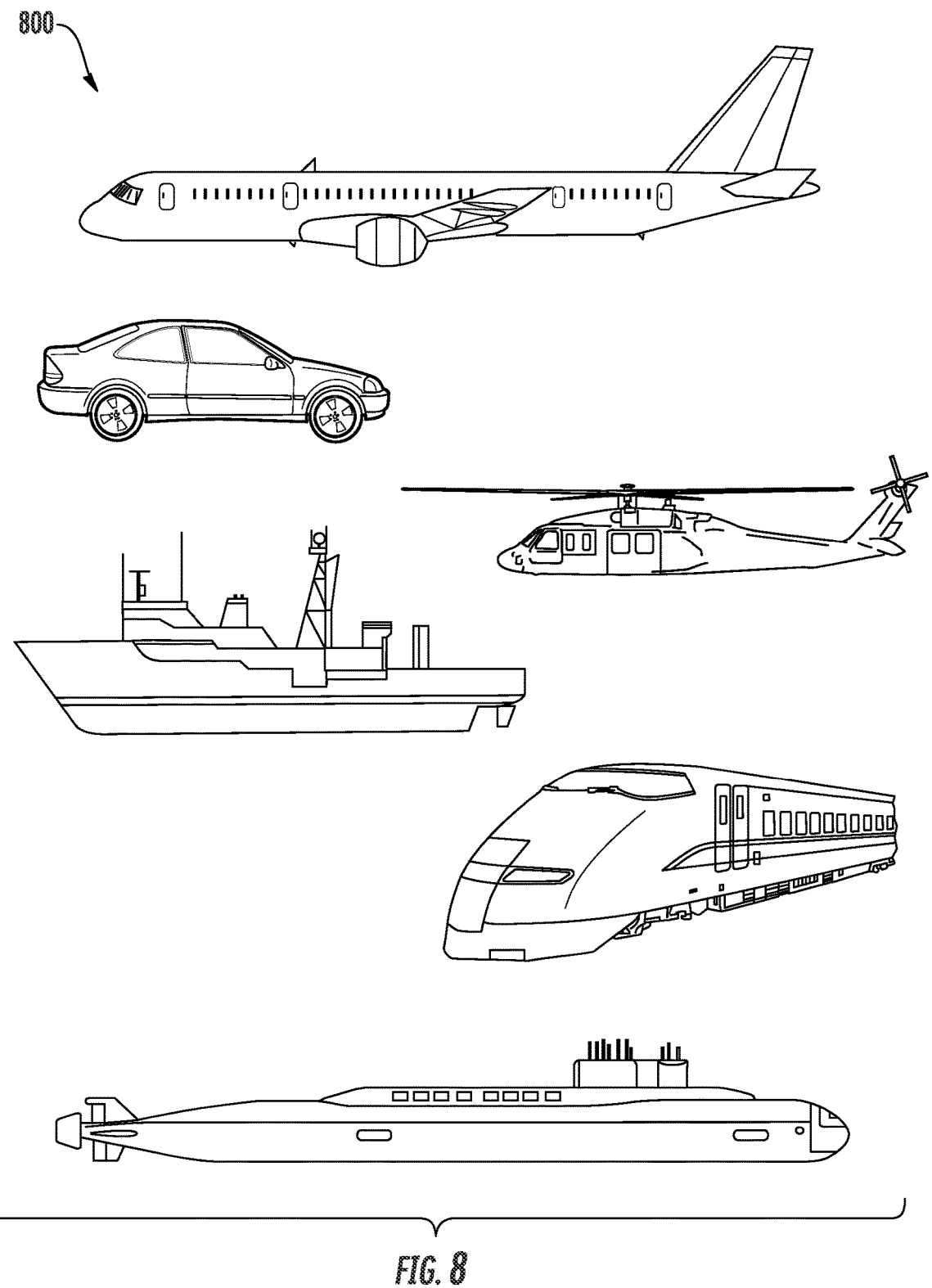
FIG. 8 provides example vehicles according to example embodiments of the present disclosure.

Although the aircraft 10 is shown and described herein as having a main/tail rotor configuration, it will be appreciated that the teachings of the present disclosure can apply to other types of aircrafts and vehicles more generally (see FIG. 8). For example, the aircraft 10 can be any aircraft or vehicle, including but not limited to coaxial rotor helicopters, tandem rotor helicopters, side-by-side rotor helicopters, twin intermeshing rotor helicopters, tilt-rotor aircrafts, an Unmanned Aerial Vehicle (UAV) of an Unmanned Aircraft System (UAS), fixed-wing aircrafts, amphibious vehicles, hovercrafts, land vehicles, other turbine driven vehicles, etc.

Figure 2:
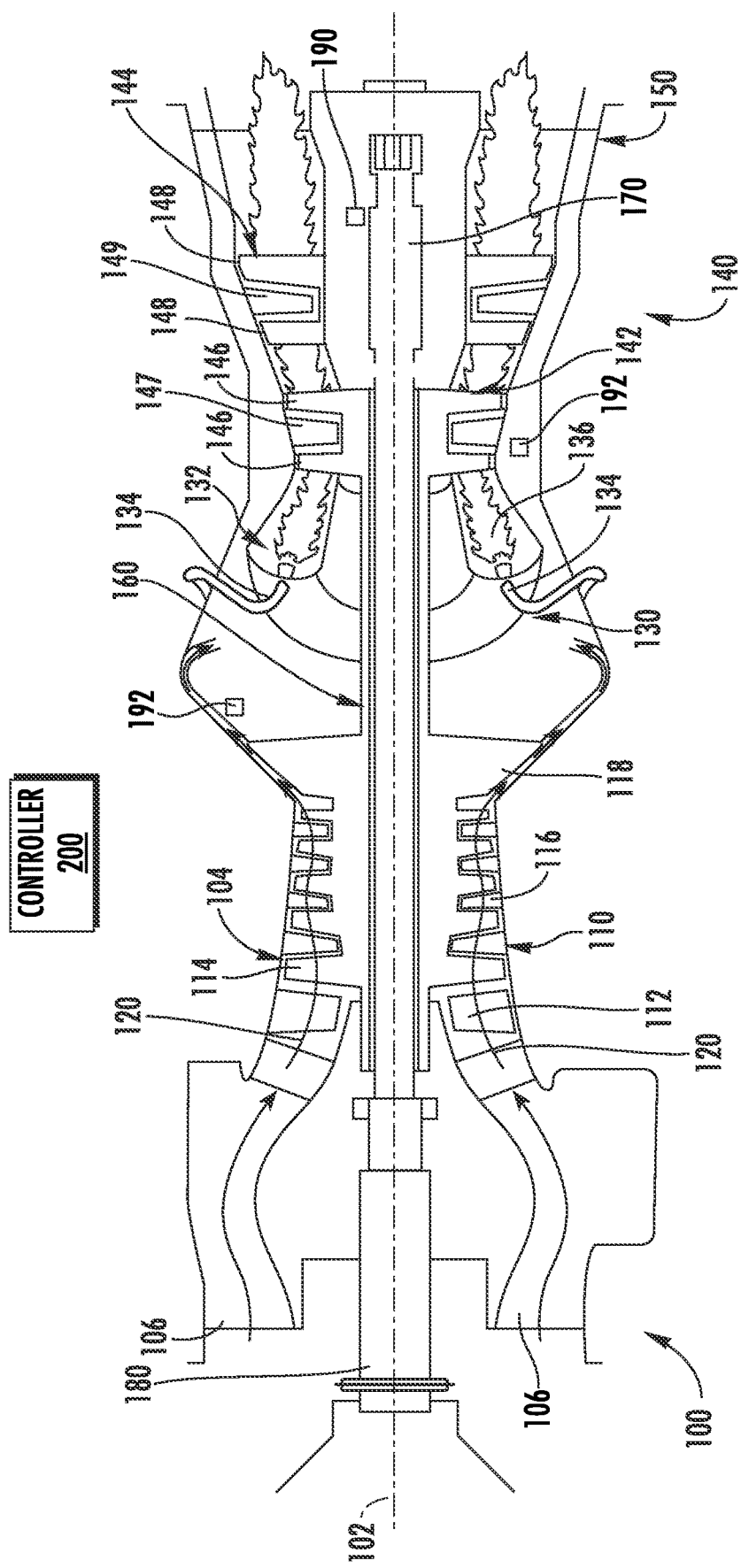
FIG. 2 is a schematic cross-sectional view of a gas turbine engine in accordance with one embodiment of the present disclosure.

FIG. 2 provides a schematic cross-sectional view of an exemplary gas turbine engine 100 in accordance with one embodiment of the present disclosure. As shown in FIG. 2, the gas turbine engine 100 defines a longitudinal or centerline axis 102 extending therethrough for reference. The gas turbine engine 100 may generally include a substantially tubular outer casing 104 that defines an annular inlet 106. The outer casing 104 may be formed from a single casing or multiple casings. The outer casing 104 encloses, in serial flow relationship, a gas generator compressor 110, a combustion section 130, a turbine section 140, and an exhaust section 150. The gas generator compressor 110 includes an annular array of inlet guide vanes 112, one or more sequential stages of compressor blades 114, one or more sequential stages of stationary and/or variable guide vanes 116, and a centrifugal compressor 118. Collectively, the compressor blades 114, vanes 116, and the centrifugal compressor 118 define a compressed air path 120.

The combustion section 130 includes a combustor defining a combustion chamber 132 and one or more fuel nozzles 134 extending into the combustion chamber 132. The fuel nozzles 134 supply fuel to mix with compressed air entering the combustion chamber 132. A mixture of fuel and compressed air combust within the combustion chamber 132 to form combustion gases 136. As will be described below in more detail, the combustion gases 136 drive the turbine 140, which in turn drives the gas generator compressor 110.

The turbine section 140 includes a gas generator turbine 142 and a power turbine 144. The gas generator turbine 142 includes one or more sequential stages of turbine rotor blades 146 and one or more sequential stages of stator vanes 147. Likewise, the power turbine 144 includes one or more sequential stages of turbine rotor blades 148 and one or more sequential stages of stator vanes 149. Additionally, the gas generator turbine 142 drives the gas generator compressor 110 via a gas generator shaft 160, and the power turbine 144 drives an output shaft 180 via a power turbine shaft 170.

More specifically, as shown in the embodiment illustrated in FIG. 2, the gas generator compressor 110 and the gas generator turbine 142 are coupled to one another via the gas generator shaft 160, and the power turbine 144 and the output shaft 180 are coupled to one another via the power turbine shaft 170. In operation, the combustion gases 136 drive both the gas generator turbine 142 and the power turbine 144. As the gas generator turbine 142 rotates around the centerline axis 102, the gas generator compressor 110 and the gas generator shaft 160 both also rotate around the centerline axis 102. Further, as the power turbine 144 rotates, the power turbine shaft 170 rotates and transfers rotational energy to the output shaft 180. As an example, the gas turbine engine 100 may be the first and second gas turbine engines 60, 62 of FIG. 1, and the output shaft 180 may rotate both the main and tail rotor blades 44, 54 of the aircraft 10.

Still referring to FIG. 2, the gas turbine engine 100 also includes a first sensor 190 and a second sensor 192. In one embodiment, the first sensor 190 may be configured to sense information indicative of a rotational speed $N_P$ of the power turbine shaft 170. However, in alternative embodiments, the first sensor 190 may be configured to sensor information indicative of a rotational speed $N_R$ of the output shaft 180. The second sensor 192 may be configured as at least one of a pressure sensor or a temperature sensor. For example, in one exemplary embodiment, the second sensor 192 may be a temperature sensor configured to sense information indicative of a turbine gas temperature $T_{4.5}$ of the gas turbine engine 100. Alternatively, or in addition to, the second sensor 192 may be a pressure sensor configured to sense information indicative of a compressor discharge pressure $P_{S3}$ of the gas turbine engine 100.

Referring briefly now to FIGS. 1 and 2, it should be appreciated, that in at least certain exemplary embodiments, one or both of the first and second gas turbine engines 60, 62 of the aircraft 10 in FIG. 1 may be configured in substantially the same manner as the gas turbine engine 100 depicted in FIG. 2. In addition, the first and second gas turbine engines 60, 62 may be mechanically coupled to one another such that the first and second gas turbine engines 60, 62 operate together. For example, the first and second gas turbine engines 60, 62 may be ganged together in a gearbox by, e.g., differentials and one-way clutches (such as sprag clutches), such that they operate together.

It should be appreciated, however, that in other exemplary embodiments, the gas turbine engine of FIG. 2 may instead have any other suitable configuration. For example, in other exemplary embodiments, the combustion section 130 may include a reverse flow combustor. Additionally, in still other exemplary embodiments, the gas turbine engine 100 may not be configured as a dual spool machine, and instead may include a common shaft configured to couple the compressor, the turbine, and the output shaft.

As shown schematically in FIG. 2, the gas turbine engine 100 can include a controller 200. In general, the controller 200 may correspond to any suitable processor-based device. For instance, the controller 200 can include one or more processors and one or more memory devices. The one or more processors can be configured to perform a variety of computer-implemented functions (e.g., performing the operations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the one or more memory devices can include various memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. The memory 208 may store computer-executable instructions that, when executed by the one or more processors, cause the one or more processors to perform operations. The controller 200 can be an Electronic Engine Controller (EEC) or a Digital Engine Controller (DEC), for example. The controller 200 can be part of a Full Authority Digital Engine Control (FADEC) system. Moreover, the controller 200 can be communicatively coupled via one or more wired and/or wireless connections with one or more input devices within the cockpit 20, one or more controllable devices onboard the gas turbine engine 100, one or more sensors, such as sensors 190, 192, among other devices and elements. The one or more controllable devices within the gas turbine engine 100, can include, without limitation, fuel metering or control valves, fuel pumps, other fuel control units, variable geometry elements, etc. The input devices can include, without limitation, the collective pitch input device 22, the cyclic pitch input device 23, the tail rotor input device 24, the first throttle input device 26, the second throttle input device 28, and the instrument panel 30, among other devices.

Figure 3:
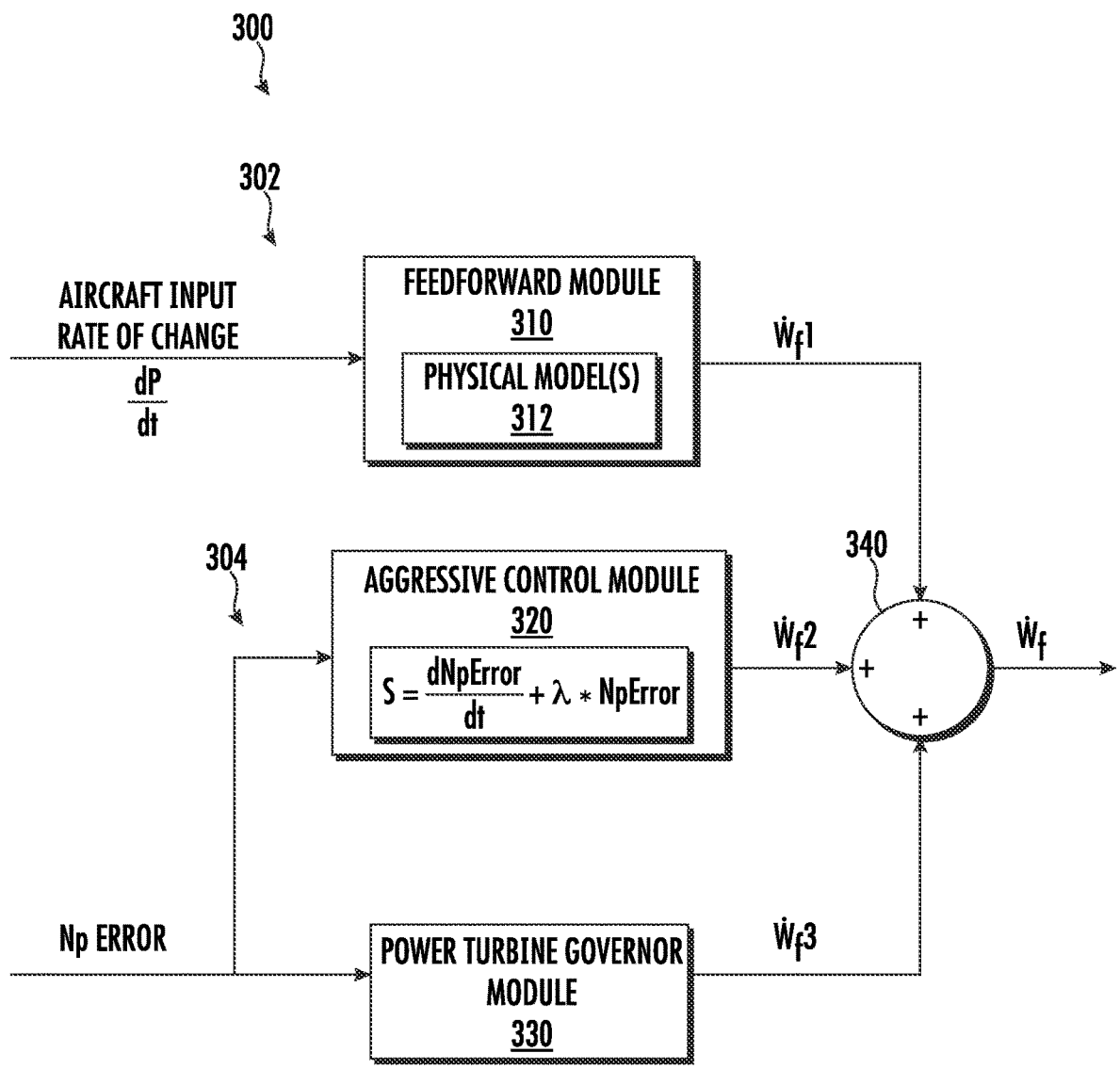
FIG. 3 is a logic diagram depicting turboshaft speed control logic in accordance with one embodiment of the present disclosure.

FIG. 3 provides a control logic diagram in accordance with one example embodiment of the present disclosure. Particularly, the control logic diagram of FIG. 3 depicts turboshaft speed control logic 300 that, when executed by one or more processors, seeks to maintain a constant power turbine speed stably in response to small disturbances in rotor load and aggressively in response to large disturbances in rotor load. The turboshaft speed control logic 300 synthesizes these two objectives into one cohesive control scheme. In general, the turboshaft speed control logic 300 will be described with reference to the aircraft 10 and the gas turbine engine 100 described above with reference to FIGS. 1 and 2. However, in other embodiments, the turboshaft speed control logic 300 may be implemented or used in association with any other aircraft and/or suitable gas turbine engine.

The turboshaft speed control logic 300 includes a feedforward governing module 302 and a feedback governing module 304. As depicted in FIG. 3, the turboshaft speed control logic 300 includes a feedforward module 310, an aggressive control module 320, and a power turbine governor module 330. The feedforward module 310 is a component of the feedforward governing module 302 while the aggressive control module 320 and the power turbine governor module 330 are components of the feedback governing module 304. For this embodiment, the aggressive control module 320 and the power turbine governor module 330 are separate modules and are arranged in parallel with respect to one another in the feedback governing module 304.

Regarding the feedforward governing module 302, the feedforward module 310, when executed, translates a rate of change of aircraft inputs using one or more physical models 312 of the rotor system of the aircraft 10 into a first fuel flow demand $\dot{W}_f1$. Stated another way, the one or more processors can determine, by executing the feedforward module 310, the first fuel flow demand $\dot{W}_f1$ based at least in part on a power demand rate dP/dt associated with a rotor system of the aircraft 10, e.g., the main rotor 40 of the aircraft 10 of FIG. 1. The first fuel flow demand $\dot{W}_f1$ output from the feedforward module 310 is routed to a summation block 340.

Generally, the feedforward module 310 is tuned to ensure that first fuel flow demands output therefrom will not force the engine to accelerate or decelerate in the wrong direction. Moreover, the feedforward module 310 is tuned to the rotor system without regard for the engine capability, which allows for aircraft handling qualities to be specifically targeted and tuned. Further, the feedforward module 310 is not rate limited, which ultimately allows for quick initial acceleration or deceleration of the rotor system. In addition, using the rate of change of aircraft inputs as opposed to direct inputs may reduce the physical modeling of the rotor system to an estimation of the partial derivative, rather than an exact calculation.

The rate of change of aircraft inputs can be derived from operator manipulation of an operator-manipulated input device (positioned onboard the aircraft 10 or offboard the aircraft 10 at a remote pilot station). The operator-manipulated input device can be at least one of the collective pitch input device 22, the cyclic pitch input device 23, and the tail rotor input device 24 depicted in FIG. 1, for example. Additionally or alternatively, the rate of change of aircraft inputs can be derived from an automated flight system manipulating the power demand associated with a rotor system of the aircraft 10.

In one example embodiment, the operator manipulated input device may be the collective pitch input device 22 of FIG. 1. As such, at a first timestep, in response to manipulation of the collective pitch input device 22, the collective pitch input device 22 or other sensor onboard the aircraft 10 may be configured to generate a first signal, e.g., indicating an increase or decrease in the vertical lift demanded of the aircraft 10. Then, at a second timestep, in response to manipulation of the collective pitch input device 22, the collective pitch input device 22 or other sensor onboard the aircraft 10 may be configured to generate a second signal, e.g., indicating an increase or decrease in the vertical lift demanded of the aircraft 10. Based on the first signal and the second signal, as will be appreciated, a power demand rate dP/dt associated with the main rotor 40.

Regarding the feedback governing module 304, the power turbine governor module 330, when executed, translates a power turbine speed error $N_p$ Error into a third fuel flow demand $\dot{W}_f3$. The power turbine speed error $N_p$ Error indicates a speed error between a reference speed of the power turbine 144 and the actual speed of the power turbine 144. When executed, the power turbine governor module 330 can translate the power turbine speed error $N_p$ Error into the third fuel flow demand $\dot{W}_f3$, e.g., using one or more models, lookup tables, a combination thereof, etc. The third fuel flow demand $\dot{W}_f3$ output from the power turbine governor module 330 is routed to the summation block 340.

The aggressive control module 320, when executed, utilizes the power turbine speed error $N_p$ Error as well. Specifically, when executed, the aggressive control module 320 calculates a system error s based at least in part on a relationship between the power turbine speed error $N_p$ Error, a power turbine speed error rate $$\frac{dNpError}{dt},$$

and a bandwidth $\lambda$ of the one or more processors executing the aggressive control module 320. Particularly, the system error s is defined by the following equation:

$$s = \frac{dNpError}{dt} + \lambda * NpError \qquad \text{(Equation 1)}$$

wherein s is the system error, NpError is the power turbine speed error, $$\frac{dNpError}{dt}$$

is the power turbine speed error rate, and λ is a bandwidth of the one or more processors executing the aggressive control module 320. When executed, the aggressive control module 320 translates the system error s into a second fuel flow demand $\dot{W}_f2$. In this way, the second fuel flow demand $\dot{W}_f2$ is determined based at least in part on the determined system error s. The second fuel flow demand $\dot{W}_f2$ output from the aggressive control module 320 is routed to the summation block 340.

Execution of the aggressive control module 320 will now be described in further detail. As depicted in FIG. 3, the $N_p$ Error is input into the aggressive control module 320. As noted, the power turbine speed error $N_p$ Error indicates a speed error between a reference speed of the power turbine 144 and the actual speed of the power turbine 144. The power turbine speed error rate $$\frac{dNpError}{dt}$$

can be derived from the power turbine speed error $N_p$ Error. For instance, the power turbine speed error $N_p$ Error at a first timestep and the power turbine speed error $N_p$ Error at a second timestep can be used to derive the rate of change of the power turbine speed error or power turbine speed error rate $$\frac{dNpError}{dt},$$

wherein the second timestep occurs later in time than the first timestep. The bandwidth λ of the one or more processors executing the aggressive control module 320 is set to attenuate drivetrain resonant frequencies and account for the bandwidth capability of the power turbine governor module 330.

Figure 4:
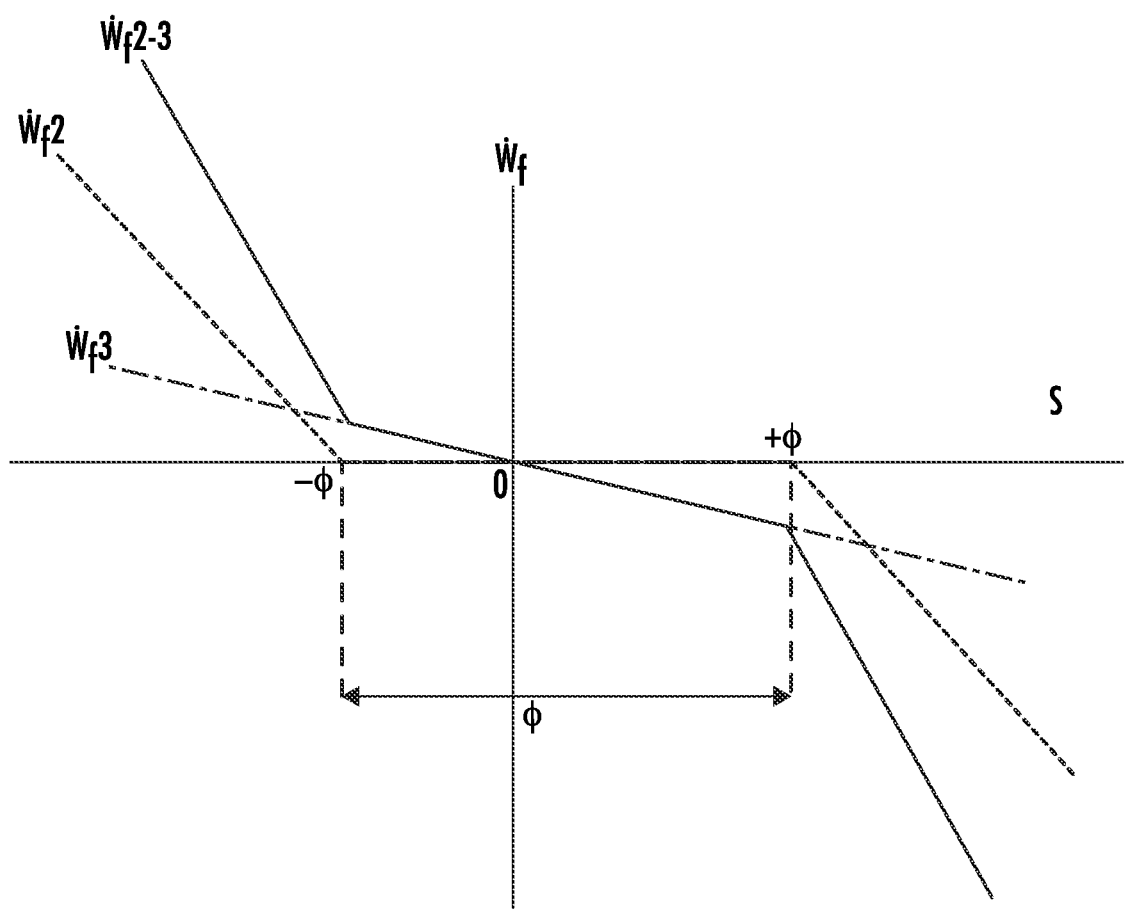
FIG. 4 is a graph representing fuel flow as a function of system error in accordance with one embodiment of the present disclosure.

With the power turbine speed error $N_p$ Error, the power turbine speed error rate $$\frac{dNpError}{dt},$$

and the bandwidth λ of the one or more processors executing the aggressive control module 320 calculated or known, the system error s can be determined by the one or more processors executing the aggressive control module 320. As shown in FIG. 4, the second fuel flow demand $\dot{W}_f2$ can be scheduled as a function of the system error s.

As depicted, the aggressive control module 320 includes a dead-band φ that indicates a range or band of system errors in which the second fuel demand $\dot{W}_f2$ is determined as being zero. That is, the dead-band φ indicates a band of system errors that, when the system error s is determined to be within, the second fuel demand $\dot{W}_f2$ is determined to be at or about zero. The dead-band φ ranges between a first bound −φ and a second bound +φ as depicted in FIG. 4. Notably, when the system error s is determined to be within the dead-band φ, the second fuel demand $\dot{W}_f2$ is scheduled as being zero. In this regard, the aggressive control module 320 is not active when the system error s is determined as being within the dead-band φ. In contrast, when the system error s is determined to be not within the dead-band φ, the second fuel demand $\dot{W}_f2$ is determined as being not zero. Accordingly, the aggressive control module 320 is active when the system error s is determined as being not within the dead-band φ.

The first bound −φ and a second bound +φ of the dead-band p can be tuned so that the aggressive control module 320 is active only when there are large disturbances with the rotor system. For instance, system errors that are left of the first bound −φ and system errors that are right of the second bound +φ correspond to relatively large disturbances while system errors within the dead-band φ (or that are both right of the first bound −φ and left of the second bound +φ) correspond to relatively small disturbances associated with the rotor system.

For system errors left of the first bound −φ, the scheduled second fuel demand $\dot{W}_f2$ corresponds to an increased demand in fuel to account for the relatively large disturbance associated with the rotor system. For instance, as one example, additional and significant lift may be demanded so that the aircraft 10 may perform a vertical climb. Thus, the rotor system is subjected to a relatively large disturbance. To account for the demanded additional and significant lift, the aggressive control module 320 reacts quickly and forcefully to apply a "kick" to rapidly increase the fuel flow to the engine 100. Accordingly, the second fuel demand $\dot{W}_f2$ output by the aggressive control module 320 corresponds to a demanded fuel flow increase.

For system errors right of the second bound +φ, the scheduled second fuel demand $\dot{W}_f2$ corresponds to a decreased demand in fuel to account for the relatively large disturbance associated with the rotor system. For instance, as one example, significantly reduced lift may be demanded. Thus, the rotor system is subjected to a relatively large disturbance. To account for the demanded reduced lift, the aggressive control module 320 reacts quickly and forcefully to apply a "kick" to rapidly decrease the fuel flow to the engine 100. Accordingly, the second fuel demand $\dot{W}_f2$ output by the aggressive control module 320 corresponds to a demanded fuel flow decrease.

As the aggressive control module 320 is only activated when there is relatively large system error, the aggressive control module 320 does not need to be held to the same stability requirements as the power turbine governor module 330 and does not need to attenuate modes in the rotor system. Therefore, as noted, the aggressive control module 320 can react much more quickly and forcefully than gain kickers of traditional power turbine governors.

Further, the dead-band φ, or rather the first and second bounds −φ, +φ thereof, can be tuned to manage the transition between the stable power turbine governor module 330 and the aggressive control module 320 for optimal or otherwise improved system response. This may allow for the outputs of the feedback governing module 304 to smoothly transition between governing with the power turbine governor module 330 when the system error s is relatively small and with kick using the aggressive control module 320 in addition to the power turbine governor module 330 when the system error s is relatively large. The dead-band φ can be tuned automatically, e.g., by an autotuning loop, or can be tuned manually. Generally, the aggressive control module 320 will be less active the larger the dead-band φ, and conversely, the aggressive control module 320 will be more active the smaller the dead-band φ.

As depicted in FIG. 4, a schedule associated with the third fuel flow demand $\dot{W}_f3$ is shown as a function of the system error s to illustrate the difference in how the feedback governing module 304 reacts to small disturbances compared to large disturbances. Notably, the slope of the schedule associated with the third fuel flow demand $\dot{W}_f3$ is smaller or less steep than the slope of the non-dead-band portions of the schedule of associated with the second fuel flow demand $\dot{W}_f2$. In this regard, when the system error s is relatively small, the power turbine governor module 330 reacts in a relatively conservative manner to increase or decrease fuel flow and the aggressive control module 320 is inactive. Indeed, a feedback schedule corresponding to a composite feedback fuel flow demand $\dot{W}_f2$-3 traces directly along the schedule associated with the third fuel flow demand $\dot{W}_f3$ when the system error s is within the dead-band $\phi$. The feedback schedule associated with the composite feedback fuel flow demand $\dot{W}_f2$-3 represents a combination of the schedule associated with the second fuel flow demand $\dot{W}_f2$ and the third fuel flow demand $\dot{W}_f3$. When the system error s transitions from a small disturbance to a large disturbance, e.g., by the system error s being determined to be not within the dead-band $\phi$, the feedback schedule associated with the composite feedback fuel flow demand $\dot{W}_f2$-3 transitions relatively smoothly to incorporating the "kick" from the aggressive control module 320 compared to gain kickers of traditional power turbine governor modules. The relative gain of the aggressive control module 320 is placed to smoothly transition between the aggressive control and non-aggressive control.

Referring again to FIG. 3, the one or more processors can determine a composite fuel flow demand $\dot{W}_f$. Particularly, the one or more processors can determine a composite fuel flow demand $\dot{W}_f$ based at least in part on the first fuel flow demand $\dot{W}_f1$, the second fuel flow demand $\dot{W}_f2$, and the third fuel flow demand $\dot{W}_f3$. To determine the composite fuel flow demand $\dot{W}_f$, the one or more processors can execute the summation block 340 to sum the first fuel flow demand $\dot{W}_f1$, the second fuel flow demand $\dot{W}_f2$, and the third fuel flow demand $\dot{W}_f3$. In this way, the composite fuel flow demand $\dot{W}_f$ can be a summation of the first fuel flow demand $\dot{W}_f1$, the second fuel flow demand $\dot{W}_f2$, and the third fuel flow demand $\dot{W}_f3$. As will be appreciated from the teachings above, when the system error s is within the dead-band $\phi$, the second fuel flow demand $\dot{W}_f2$ equates to zero. When the system error s is not within the dead-band $\phi$, the second fuel flow demand $\dot{W}_f2$ does not equate to zero, and consequently, the aggressive control module 320 provides a "kick" to quickly and forcefully respond to large disturbances associated with the rotor system. As will be appreciated, the one or more processors can control a fuel flow to the gas turbine engine 100 based at least in part on the composite fuel flow demand $\dot{W}_f$, e.g., by controlling one or more controllable devices that, when actuated, cause more or less fuel to be provided to the gas turbine engine 100 or a combustor thereof.

Figure 5:
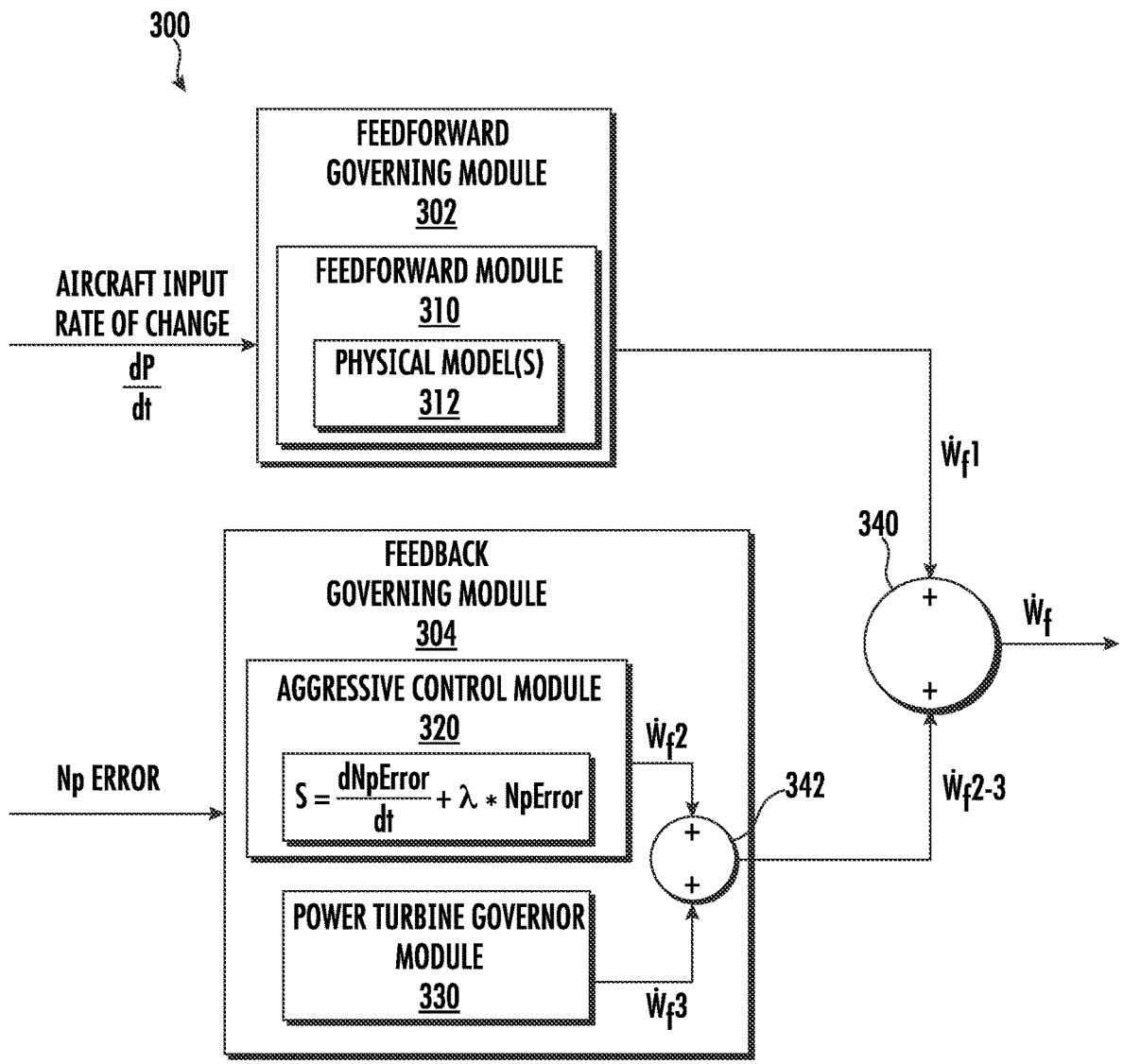
FIG. 5 is a logic diagram depicting another construction of turboshaft speed control logic in accordance with one embodiment of the present disclosure.

It will be appreciated that the turboshaft speed control logic 300 depicted in FIG. 3 can be constructed in varying ways yet may still provide the advantages and benefits disclosed herein. For instance, FIG. 5 depicts an alternative construction of the turboshaft speed control logic 300. In FIG. 5, the second fuel flow demand $\dot{W}_f2$ from the aggressive control module 320 and the third fuel flow demand $\dot{W}_f3$ from the power turbine governor 330 may be summed at summation block 342 to render a feedback fuel flow demand $\dot{W}_f2$-3. The feedback fuel flow demand $\dot{W}_f2$-3 may then be routed to summation block 340 where the feedback fuel flow demand $\dot{W}_f2$-3 is summed with the first fuel flow demand $\dot{W}_f1$ from the feedforward module 310. It will be appreciated that FIG. 5 depicts one example alternative to the construction of the turboshaft speed control logic 300 of FIG. 3 and that other alternatives are possible.

Figure 6:
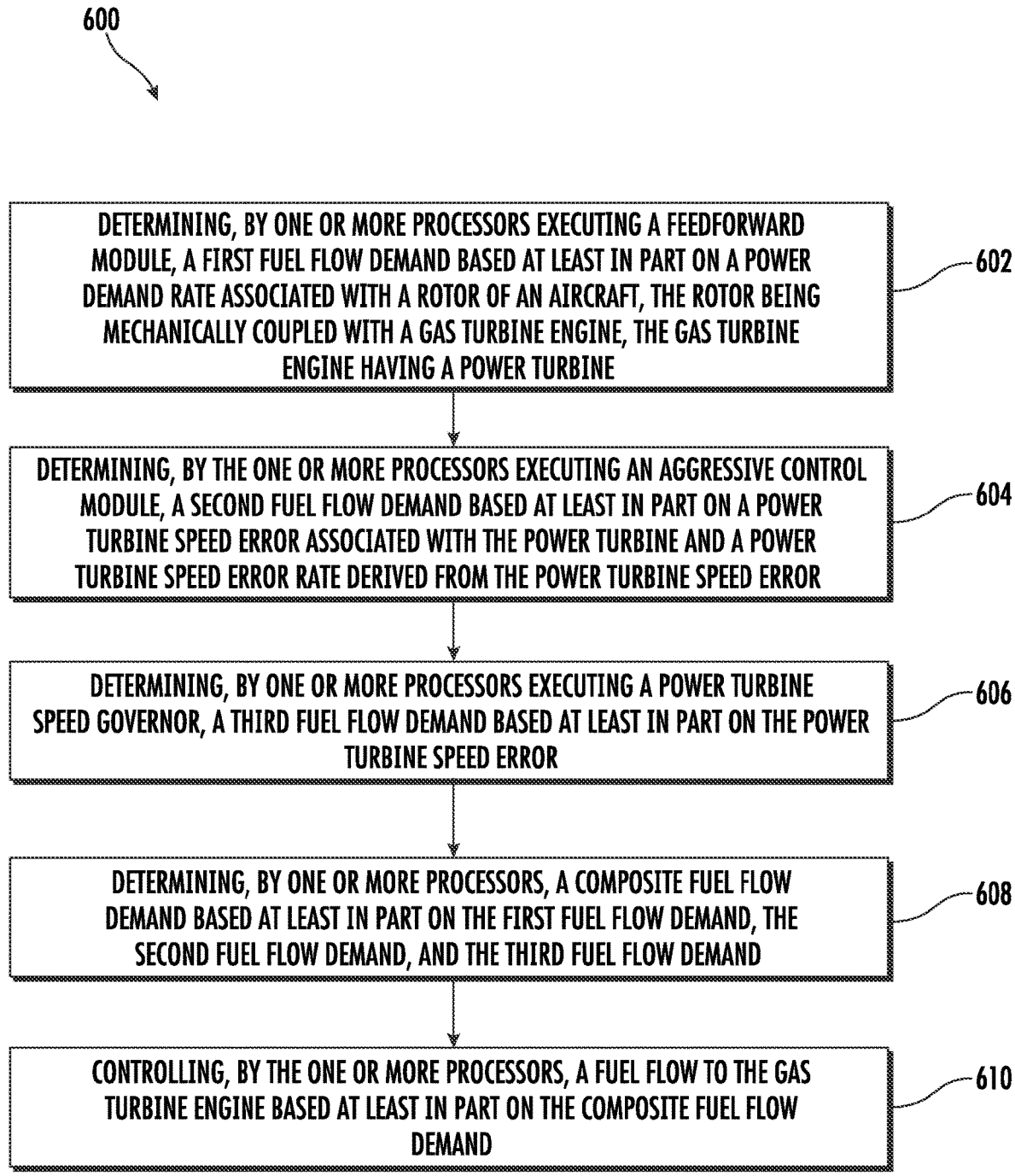
FIG. 6 is a flow diagram of an example method in accordance with an example embodiment of the present disclosure.

FIG. 6 provides a flow diagram of an example method 600 of controlling a fuel flow to a gas turbine engine in response to disturbances associated with a rotor mechanically coupled thereto. The method 600 of FIG. 6 can be implemented using, for instance, the controller 200 and other components described herein. In some implementations, the gas turbine engine can be the turboshaft gas turbine engine 100 of FIG. 2 and the rotor can be the main rotor 40 of the aerial vehicle of FIG. 1. FIG. 6 depicts actions performed in a particular order for purposes of illustration and discussion. Those of ordinary skill in the art, using the disclosure provided herein, will understand that various actions of the method 600 can be modified in various ways without deviating from the scope of the present disclosure.

At 602, the method 600 includes determining, by one or more processors executing a feedforward module, a first fuel flow demand based at least in part on a power demand rate associated with a rotor of an aircraft, the rotor being mechanically coupled with a gas turbine engine, the gas turbine engine having a power turbine. For instance, the power demand rate can be a rate of change in the pitch associated with blades of a main rotor of the aircraft. The rate of change can be determined in response to manipulation of a collective pitch input device at a first timestep to a second timestep, for example.

At 604, the method 600 includes determining, by the one or more processors executing an aggressive control module, a second fuel flow demand based at least in part on a power turbine speed error associated with the power turbine and a power turbine speed error rate derived from the power turbine speed error. In some implementations, determining at 604 includes calculating, by the one or more processors, a system error associated with the rotor based at least in part on a relationship between the power turbine speed error, the power turbine speed error rate, and a bandwidth of the one or more processors executing the aggressive control module. In such implementations, the second fuel flow demand is determined based at least in part on the system error. For instance, the second fuel flow demand can be scheduled as a function of system error, e.g., as shown in FIG. 4. The second fuel flow demand can be scheduled as a function of the system error so that the "kick" provided by the aggressive control module can be proportional to the size of the disturbance. In this way, very large kicks can be applied to very large disturbances while less large kicks can be applied to less large disturbances. As noted, for small disturbances, the aggressive control module may not kick at all, e.g., due to a scheduled dead-band, thus allowing the feedback governing control to be handled by the power turbine governor module. The system error can be defined according to Equation 1 disclosed herein.

Further, in some implementations, the aggressive control module includes a dead-band that indicates a band of system errors in which, when the system error is within the dead-band, the second fuel flow demand is determined as being zero. When the system error is not within the dead-band, the second fuel flow demand is determined as being not zero. The dead-band can be bound by a first bound (e.g., a negative system bound) and a second bound (e.g., a positive system bound). The first and second bounds can be dynamically tuned or adjusted, e.g., to manage the transition between the stable response provided by the power turbine governor and the aggressive control module for optimal system response.

At 606, the method 600 includes determining, by the one or more processors executing a power turbine governor module, a third fuel flow demand based at least in part on the power turbine speed error. For instance, the power turbine speed error can be directly translated into a third fuel flow demand, e.g., by using one or more models or lookup tables. The aggressive control module and the power turbine governor module can be modules of a feedback governing module and can be arranged in parallel with respect to one another.

At 608, the method 600 includes determining, by the one or more processors, a composite fuel flow demand based at least in part on the first fuel flow demand, the second fuel flow demand, and the third fuel flow demand. For instance, in some implementations, determining the composite fuel flow demand at 608 can include summing, by the one or more processors, the first fuel flow demand, the second fuel flow demand, and the third fuel flow demand. The three fuel flow demands can be summed at a single summation block, e.g., at summation block 340 as shown in FIG. 3. Accordingly, the composite fuel flow demand is a summation of the first fuel flow demand, the second fuel flow demand, and the third fuel flow demand.

In other implementations, determining the composite fuel flow demand at 608 can include summing, by the one or more processors, the second fuel flow demand and the third fuel flow demand to render a feedback fuel flow demand, e.g., as summation block 342 depicted in FIG. 5. In such implementations, the method 600 can further include summing, by the one or more processors, the first fuel flow demand and the feedback fuel flow demand, e.g., as summation block 340 depicted in FIG. 5.

At 610, the method 600 includes controlling, by the one or more processors, a fuel flow to the gas turbine engine based at least in part on the composite fuel flow demand. For instance, based on the composite fuel flow demand, one or more controllable devices, e.g., a fuel metering valve, can be actuated or controlled to allow more or less fuel to the engine. In this way, the engine can better maintain constant speed despite disturbances in rotor load.

Figure 7:
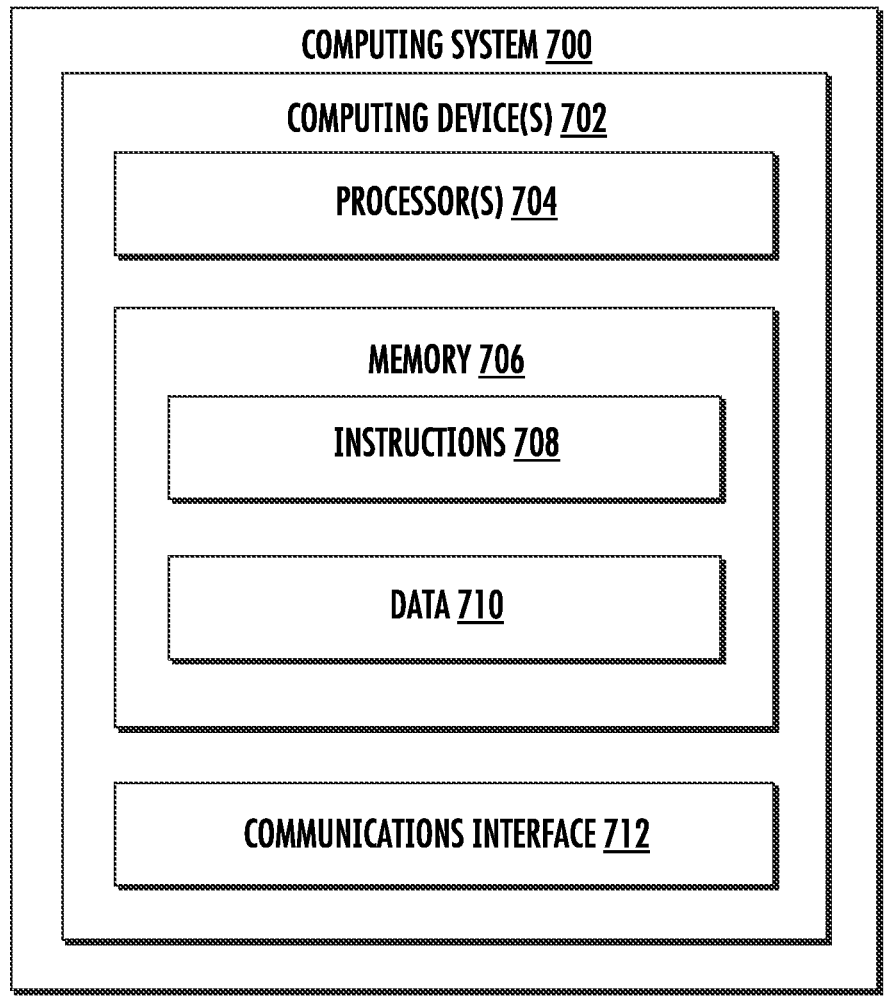
FIG. 7 provides a schematic view of a computing system for implementing one or more aspects of the present disclosure according to example embodiments of the present disclosure.

FIG. 7 provides a block diagram of an example computing system 700. The computing system 700 can be used to implement the aspects disclosed herein. The computing system 700 can include one or more computing device(s) 702. The controller 200 disclosed herein can be constructed and may operate in a same or similar manner as one of the computing devices 702, for example.

As shown in FIG. 7, the one or more computing device(s) 702 can each include one or more processor(s) 704 and one or more memory device(s) 706. The one or more processor(s) 704 can include any suitable processing device, such as a microprocessor, microcontroller, integrated circuit, logic device, or other suitable processing device. The one or more memory device(s) 706 can include one or more computer-readable media, including, but not limited to, non-transitory computer-readable media, RAM, ROM, hard drives, flash drives, and other memory devices, such as one or more buffer devices.

The one or more memory device(s) 706 can store information accessible by the one or more processor(s) 704, including computer-readable instructions 708 that can be executed by the one or more processor(s) 704. The instructions 708 can be any set of instructions or control logic that when executed by the one or more processor(s) 704, cause the one or more processor(s) 704 to perform operations. The instructions 708 can be software written in any suitable programming language or can be implemented in hardware. In some embodiments, the instructions 708 can be executed by the one or more processor(s) 704 to cause the one or more processor(s) 704 to perform operations.

The memory device(s) 706 can further store data 710 that can be accessed by the processor(s) 704. For example, the data 710 can include sensor data such as engine parameters, model data, logic data, etc., as described herein, aircraft inputs, power demand rates, etc. The data 710 can include one or more table(s), function(s), algorithm(s), model(s), equation(s), etc. according to example embodiments of the present disclosure.

The one or more computing device(s) 702 can also include a communication interface 712 used to communicate, for example, with the other components of the aircraft. The communication interface 712 can include any suitable components for interfacing with one or more network(s), including for example, transmitters, receivers, ports, controllers, antennas, or other suitable components.

FIG. 8 provides example vehicles 800 according to example embodiments of the present disclosure. The inventive aspects of the present disclosure can be implemented on an aircraft, such as a helicopter or fixed-wing aircraft, automobile, boat, submarine, train, unmanned aerial vehicle or drone and/or on any other suitable vehicle. While the present disclosure is described herein with reference to an aircraft implementation, this is intended only to serve as an example and not to be limiting. One of ordinary skill in the art would understand that the inventive aspects of the present disclosure can be implemented on other vehicles without deviating from the scope of the present disclosure. Further, the inventive aspects can be implemented for non-vehicle applications. For instance, the inventive aspects can be applied to nuclear power applications, e.g., emergency diesel generators for nuclear reactors, and turbine power generation.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the present disclosure are provided by the subject matter of the following clauses:

1. A gas turbine engine, comprising: a power turbine mechanically coupled with a load; and one or more processors configured to: determine a first fuel flow demand based at least in part on a power demand rate associated with the load; determine a second fuel flow demand based at least in part on a power turbine speed error associated with the power turbine and a power turbine speed error rate derived from the power turbine speed error; determine a third fuel flow demand based at least in part on the power turbine speed error; determine a composite fuel flow demand based at least in part on the first fuel flow demand, the second fuel flow demand, and the third fuel flow demand; and control a fuel flow to the gas turbine engine based at least in part on the composite fuel flow demand.

2. The gas turbine engine of any preceding clause, wherein the one or more processors execute a feedforward module to determine the first fuel flow demand based at least in part on the power demand rate associated with the load.

3. The gas turbine engine of any preceding clause, wherein the one or more processors execute a power turbine governor module to determine the third fuel flow demand based at least in part on the power turbine speed error.

4. The gas turbine engine of any preceding clause, wherein the one or more processors execute an aggressive control module to determine the second fuel flow demand based at least in part on the power turbine speed error associated with the power turbine and the power turbine speed error rate derived from the power turbine speed error.

5. The gas turbine engine of any preceding clause, wherein in determining the second fuel flow demand, the one or more processors are configured to: calculate a system error associated with the load based at least in part on a relationship between the power turbine speed error, the power turbine speed error rate, and a bandwidth of the one or more processors executing the aggressive control module, and wherein the second fuel flow demand is determined based at least in part on the system error.

6. The gas turbine engine of any preceding clause, wherein the system error is defined by:

$$s = \frac{dNpError}{dt} + \lambda * NpError,$$

wherein s is the system error, NpError is the power turbine speed error, $$\frac{dNpError}{dt}$$

is the power turbine speed error rate, and λ is the bandwidth associated with the one or more processors executing the aggressive control module.

7. The gas turbine engine of any preceding clause, wherein the aggressive control module includes a dead-band that indicates a band of system errors in which, when the system error is within the dead-band, the second fuel flow demand is determined as being zero.

8. The gas turbine engine of any preceding clause, wherein when the system error is not within the dead-band, the second fuel flow demand is determined as being not zero.

9. The gas turbine engine of any preceding clause, wherein in determining the composite fuel flow demand, the one or more processors are configured to: sum the first fuel flow demand, the second fuel flow demand, and the third fuel flow demand, and wherein the composite fuel flow demand is a summation of the first fuel flow demand, the second fuel flow demand, and the third fuel flow demand.

10. The gas turbine engine of any preceding clause, wherein the aggressive control module and the power turbine governor module are modules of a feedback governing module and are arranged in parallel with respect to one another.

11. A vehicle, comprising: a rotor; a gas turbine engine mechanically coupled with the rotor, the gas turbine engine including a power turbine; and one or more processors configured to: determine, by executing a feedforward module, a first fuel flow demand based at least in part on a power demand rate associated with the rotor of the vehicle; determine, by executing an aggressive control module, a second fuel flow demand based at least in part on a power turbine speed error associated with the power turbine, a power turbine speed error rate derived from the power turbine speed error, and a bandwidth of the one or more processors executing the aggressive control module; determine, by executing a power turbine governor module, a third fuel flow demand based at least in part on the power turbine speed error; determine a composite fuel flow demand based at least in part on the first fuel flow demand, the second fuel flow demand, and the third fuel flow demand; and control a fuel flow to the gas turbine engine based at least in part on the composite fuel flow demand.

12. The vehicle of any preceding clause, wherein in determining, by executing the aggressive control module, the second fuel flow demand, the one or more processors are configured to: calculate a system error associated with the rotor based at least in part on a relationship between the power turbine speed error, the power turbine speed error rate, and the bandwidth of the one or more processors executing the aggressive control module, and wherein the second fuel flow demand is determined based at least in part on the system error.

13. The vehicle of any preceding clause, wherein the system error is defined by:

$$s = \frac{dNpError}{dt} + \lambda * NpError,$$

wherein s is the system error, NpError is the power turbine speed error, $$\frac{dNpError}{dt}$$

is the power turbine speed error rate, and λ is the bandwidth associated with the one or more processors executing the aggressive control module.

14. The vehicle of any preceding clause, wherein the aggressive control module includes a dead-band that indicates a band of system errors in which, when the system error is within the dead-band, the second fuel flow demand is determined as being zero, and wherein when the system error is not within the dead-band, the second fuel flow demand is determined as being not zero.

15. The vehicle of any preceding clause, wherein the vehicle is a helicopter and the rotor is a main rotor of the helicopter.

16. A non-transitory computer readable medium comprising computer-executable instructions, which, when executed by one or more processors associated with a gas turbine engine, cause the one or more processors to: determine, by executing a feedforward module, a first fuel flow demand based at least in part on a power demand rate associated with a load mechanically coupled with the gas turbine engine; determine, by executing an aggressive control module, a second fuel flow demand based at least in part on i) a power turbine speed error associated with a power turbine of the gas turbine engine; and ii) a power turbine speed error rate derived from the power turbine speed error; determine, by executing a power turbine governor module, a third fuel flow demand based at least in part on the power turbine speed error; determine a composite fuel flow demand based at least in part on the first fuel flow demand, the second fuel flow demand, and the third fuel flow demand; and control a fuel flow to the gas turbine engine based at least in part on the composite fuel flow demand.

17. The non-transitory computer readable medium of any preceding clause, wherein in executing the computer-executable instructions to determine, by executing the aggressive control module, the second fuel flow demand, the one or more processors are caused to: calculate a system error based at least in part on a relationship between the power turbine speed error, the power turbine speed error rate, and a bandwidth of the one or more processors executing the aggressive control module, and wherein the second fuel flow demand is determined based at least in part on the system error.

18. The non-transitory computer readable medium of any preceding clause, wherein the system error is defined by:

$$s = \frac{dNpError}{dt} + \lambda * NpError,$$

wherein s is the system error, NpError is the power turbine speed error, $$\frac{dNpError}{dt}$$

is the power turbine speed error rate, and $\lambda$ is a bandwidth associated with the one or more processors executing the aggressive control module.

19. The non-transitory computer readable medium of any preceding clause, wherein the aggressive control module includes a dead-band that indicates a band of system errors in which, when the system error is within the dead-band, the second fuel flow demand is determined as being zero.

20. The non-transitory computer readable medium of any preceding clause, wherein when the system error is not within the dead-band, the second fuel flow demand is determined as being not zero.

21. A method, comprising: determining, by one or more processors executing a feedforward module, a first fuel flow demand based at least in part on a power demand rate associated with a rotor of an aircraft, the rotor being mechanically coupled with a gas turbine engine, the gas turbine engine having a power turbine; determining, by the one or more processors executing an aggressive control module, a second fuel flow demand based at least in part on a power turbine speed error associated with the power turbine and a power turbine speed error rate derived from the power turbine speed error; determining, by the one or more processors executing a power turbine governor module, a third fuel flow demand based at least in part on the power turbine speed error; determining, by the one or more processors, a composite fuel flow demand based at least in part on the first fuel flow demand, the second fuel flow demand, and the third fuel flow demand; and controlling, by the one or more processors, a fuel flow to the gas turbine engine based at least in part on the composite fuel flow demand.

22. A gas turbine engine, comprising: a power turbine mechanically coupled with a rotor; and one or more processors configured to: determine, by executing a feedforward module, a first fuel flow demand based at least in part on a power demand rate associated with the rotor; determine, by executing an aggressive control module, a second fuel flow demand based at least in part on a power turbine speed error associated with the power turbine and a power turbine speed error rate derived from the power turbine speed error; determine, by executing a power turbine governor module, a third fuel flow demand based at least in part on the power turbine speed error; determine a composite fuel flow demand based at least in part on the first fuel flow demand, the second fuel flow demand, and the third fuel flow demand; and control a fuel flow to the gas turbine engine based at least in part on the composite fuel flow demand.

23. An engine controller, comprising: one or more memory devices; and one or more processors configured to: determine a first fuel flow demand based at least in part on a power demand rate associated with a load mechanically coupled with an engine associated with the engine controller; determine a second fuel flow demand based at least in part on a power turbine speed error associated with a power turbine of the gas turbine engine and a power turbine speed error rate derived from the power turbine speed error; determine a third fuel flow demand based at least in part on the power turbine speed error; determine a composite fuel flow demand based at least in part on the first fuel flow demand, the second fuel flow demand, and the third fuel flow demand; and control a fuel flow to the gas turbine engine based at least in part on the composite fuel flow demand.

What is claimed is:

1. A gas turbine engine, comprising:
   a power turbine mechanically coupled with a load; and
   one or more processors configured to:
      determine a first fuel flow demand based at least in part on a power demand rate associated with the load;
      determine a second fuel flow demand based at least in part on a power turbine speed error associated with the power turbine and a power turbine speed error rate derived from the power turbine speed error;
      determine a third fuel flow demand based at least in part on the power turbine speed error;
      determine a composite fuel flow demand based at least in part on the first fuel flow demand, the second fuel flow demand, and the third fuel flow demand; and
      control a fuel flow to the gas turbine engine based at least in part on the composite fuel flow demand.

2. The gas turbine engine of claim 1, wherein the one or more processors execute a feedforward module to determine the first fuel flow demand based at least in part on the power demand rate associated with the load.

3. The gas turbine engine of claim 1, wherein the one or more processors execute a power turbine governor module to determine the third fuel flow demand based at least in part on the power turbine speed error.

4. The gas turbine engine of claim 1, wherein the one or more processors execute an aggressive control module to determine the second fuel flow demand based at least in part on the power turbine speed error associated with the power turbine and the power turbine speed error rate derived from the power turbine speed error.

5. The gas turbine engine of claim 4, wherein in determining the second fuel flow demand, the one or more processors are configured to:
calculate a system error associated with the load based at least in part on a relationship between the power turbine speed error, the power turbine speed error rate, and a bandwidth of the one or more processors executing the aggressive control module, and
wherein the second fuel flow demand is determined based at least in part on the system error.

6. The gas turbine engine of claim 5, wherein the system error is defined by:

$$s = \frac{dNpError}{dt} + \lambda * NpError$$

wherein s is the system error, NpError is the power turbine speed error, $$\frac{dNpError}{dt}$$

is the power turbine speed error rate, and λ is the bandwidth associated with the one or more processors executing the aggressive control module.

7. The gas turbine engine of claim 5, wherein the aggressive control module includes a dead-band that indicates a band of system errors in which, when the system error is within the dead-band, the second fuel flow demand is determined as being zero.

8. The gas turbine engine of claim 7, wherein when the system error is not within the dead-band, the second fuel flow demand is determined as being not zero.

9. The gas turbine engine of claim 1, wherein in determining the composite fuel flow demand, the one or more processors are configured to:
sum the first fuel flow demand, the second fuel flow demand, and the third fuel flow demand, and wherein the composite fuel flow demand is a summation of the first fuel flow demand, the second fuel flow demand, and the third fuel flow demand.

10. The gas turbine engine of claim 1, wherein the aggressive control module and the power turbine governor module are modules of a feedback governing module and are arranged in parallel with respect to one another.

11. A vehicle, comprising:
a rotor;
a gas turbine engine mechanically coupled with the rotor, the gas turbine engine including a power turbine; and
one or more processors configured to:
determine, by executing a feedforward module, a first fuel flow demand based at least in part on a power demand rate associated with the rotor of the vehicle;
determine, by executing an aggressive control module, a second fuel flow demand based at least in part on a power turbine speed error associated with the power turbine, a power turbine speed error rate derived from the power turbine speed error, and a bandwidth of the one or more processors executing the aggressive control module;
determine, by executing a power turbine governor module, a third fuel flow demand based at least in part on the power turbine speed error;
determine a composite fuel flow demand based at least in part on the first fuel flow demand, the second fuel flow demand, and the third fuel flow demand; and
control a fuel flow to the gas turbine engine based at least in part on the composite fuel flow demand.

12. The vehicle of claim 11, wherein in determining, by executing the aggressive control module, the second fuel flow demand, the one or more processors are configured to:
calculate a system error associated with the rotor based at least in part on a relationship between the power turbine speed error, the power turbine speed error rate, and the bandwidth of the one or more processors executing the aggressive control module, and
wherein the second fuel flow demand is determined based at least in part on the system error.

13. The vehicle of claim 11, wherein the system error is defined by:

$$s = \frac{dNpError}{dt} + \lambda * NpError$$

wherein s is the system error, NpError is the power turbine speed error, $$\frac{dNpError}{dt}$$

is the power turbine speed error rate, and λ is the bandwidth associated with the one or more processors executing the aggressive control module.

14. The vehicle of claim 11, wherein the aggressive control module includes a dead-band that indicates a band of system errors in which, when the system error is within the dead-band, the second fuel flow demand is determined as being zero, and wherein when the system error is not within the dead-band, the second fuel flow demand is determined as being not zero.

15. The vehicle of claim 11, wherein the vehicle is a helicopter and the rotor is a main rotor of the helicopter.

16. A non-transitory computer readable medium comprising computer-executable instructions, which, when executed by one or more processors associated with a gas turbine engine, cause the one or more processors to:
determine, by executing a feedforward module, a first fuel flow demand based at least in part on a power demand rate associated with a load mechanically coupled with the gas turbine engine;
determine, by executing an aggressive control module, a second fuel flow demand based at least in part on i) a power turbine speed error associated with a power turbine of the gas turbine engine; and ii) a power turbine speed error rate derived from the power turbine speed error;
determine, by executing a power turbine governor module, a third fuel flow demand based at least in part on the power turbine speed error;
determine a composite fuel flow demand based at least in part on the first fuel flow demand, the second fuel flow demand, and the third fuel flow demand; and
control a fuel flow to the gas turbine engine based at least in part on the composite fuel flow demand.

17. The non-transitory computer readable medium of claim 16, wherein in executing the computer-executable instructions to determine, by executing the aggressive control module, the second fuel flow demand, the one or more processors are caused to:

calculate a system error based at least in part on a relationship between the power turbine speed error, the power turbine speed error rate, and a bandwidth of the one or more processors executing the aggressive control module, and wherein the second fuel flow demand is determined based at least in part on the system error.

18. The non-transitory computer readable medium of claim 17, wherein the system error is defined by:

$$s = \frac{dNpError}{dt} + \lambda * NpError$$

wherein s is the system error, NpError is the power turbine speed error, $$\frac{dNpError}{dt}$$

is the power turbine speed error rate, and $\lambda$ is a bandwidth associated with the one or more processors executing the aggressive control module.

19. The non-transitory computer readable medium of claim 17, wherein the aggressive control module includes a dead-band that indicates a band of system errors in which, when the system error is within the dead-band, the second fuel flow demand is determined as being zero.

20. The non-transitory computer readable medium of claim 19, wherein when the system error is not within the dead-band, the second fuel flow demand is determined as being not zero.

\* \* \* \* \*